No. 688,986. Patented Dec. 17, 1901.
J. T. DEMPSEY.
GRANITOID WALK LAYING MACHINE.
(Application filed Mar. 15, 1901.)
(No Model.) 7 Sheets—Sheet 1.

Fig. 1.

Witnesses:
H. C. Rodgers
Arthur McArthur

Inventor:
J. T. Dempsey
By Fischer & Thorpe
Attys.

No. 688,986. Patented Dec. 17, 1901.
J. T. DEMPSEY.
GRANITOID WALK LAYING MACHINE.
(Application filed Mar. 15, 1901.)
(No Model.) 7 Sheets—Sheet 2.

No. 688,986. Patented Dec. 17, 1901.
J. T. DEMPSEY.
GRANITOID WALK LAYING MACHINE.
(Application filed Mar. 15, 1901.)

(No Model.) 7 Sheets—Sheet 3.

Fig. 3.

Witnesses:
H. C. Rodgers
Arthur McArthur

Inventor:
J. T. Dempsey
By Fischer + Phope
Attys

No. 688,986. Patented Dec. 17, 1901.
J. T. DEMPSEY.
GRANITOID WALK LAYING MACHINE.
(Application filed Mar. 15, 1901.)
(No Model.) 7 Sheets—Sheet 4.

Fig. 4.

Witnesses:
H. C. Rodgers
Arthur McArthur

Inventor:
J. T. Dempsey
By Fischer & Thorpe
attys.

No. 688,986. Patented Dec. 17, 1901.
J. T. DEMPSEY.
GRANITOID WALK LAYING MACHINE.
(Application filed Mar. 15, 1901.)

(No Model.) 7 Sheets—Sheet 5.

Witnesses:
H. C. Rodgers
Arthur McArthur

Inventor
J. T. Dempsey
By Fischer & Thorpe
Attys.

No. 688,986. Patented Dec. 17, 1901.
J. T. DEMPSEY.
GRANITOID WALK LAYING MACHINE.
(Application filed Mar. 15, 1901.)

(No Model.) 7 Sheets—Sheet 6.

Witnesses:
H. C. Rodgers
Arthur McArthur

Inventor:
J. T. Dempsey
By Fischer & Thorpe
attys.

No. 688,986. Patented Dec. 17, 1901.
J. T. DEMPSEY.
GRANITOID WALK LAYING MACHINE.
(Application filed Mar. 15, 1901.)
(No Model.) 7 Sheets—Sheet 7.

Witnesses:
H. C. Rodgers
Arthur McArthur

Inventor:
J. T. Dempsey
By Fischer & Thorpe
Attys.

UNITED STATES PATENT OFFICE.

JAMES T. DEMPSEY, OF KANSAS CITY, KANSAS, ASSIGNOR OF ONE-HALF TO PATRICK W. CAREY, OF KANSAS CITY, KANSAS.

GRANITOID-WALK-LAYING MACHINE.

SPECIFICATION forming part of Letters Patent No. 688,986, dated December 17, 1901.

Application filed March 15, 1901. Serial No. 51,233. (No model.)

*To all whom it may concern:*

Be it known that I, JAMES T. DEMPSEY, a citizen of the United States, and a resident of Kansas City, Wyandotte county, Kansas, have invented a new and useful Granitoid-Walk-Laying Machine, of which the following is a specification.

My invention relates to granitoid-walk-laying machines, my object being to produce a machine of this character which efficiently, quickly, and economically first mixes and lays the granitoid proper and then mixes and lays the cement surface thereon, performing such functions automatically and distributing the granitoid and cement evenly and to the depth and thickness required.

With this general object in view the invention consists in certain novel and peculiar features of construction and combinations of parts, as will be hereinafter described and claimed, and in order that it may be fully understood reference is to be had to the accompanying drawings, in which—

In the said drawings similar reference characters denote like parts in all the figures.

The platform of the machine comprises parallel side bars 1, cross-bars 2 at intervals, and the floor 3, resting upon angle-plates 4, secured to side bars 1. The platform being of considerable length is braced by a truss comprising vertical standards 5, erected on bars 1, and rods 6, connecting said standards and having their ends 7 extending downward through the side bars and engaged by clamping-nuts 8, this truss structure forming also a railing for the machine.

Figure 3:
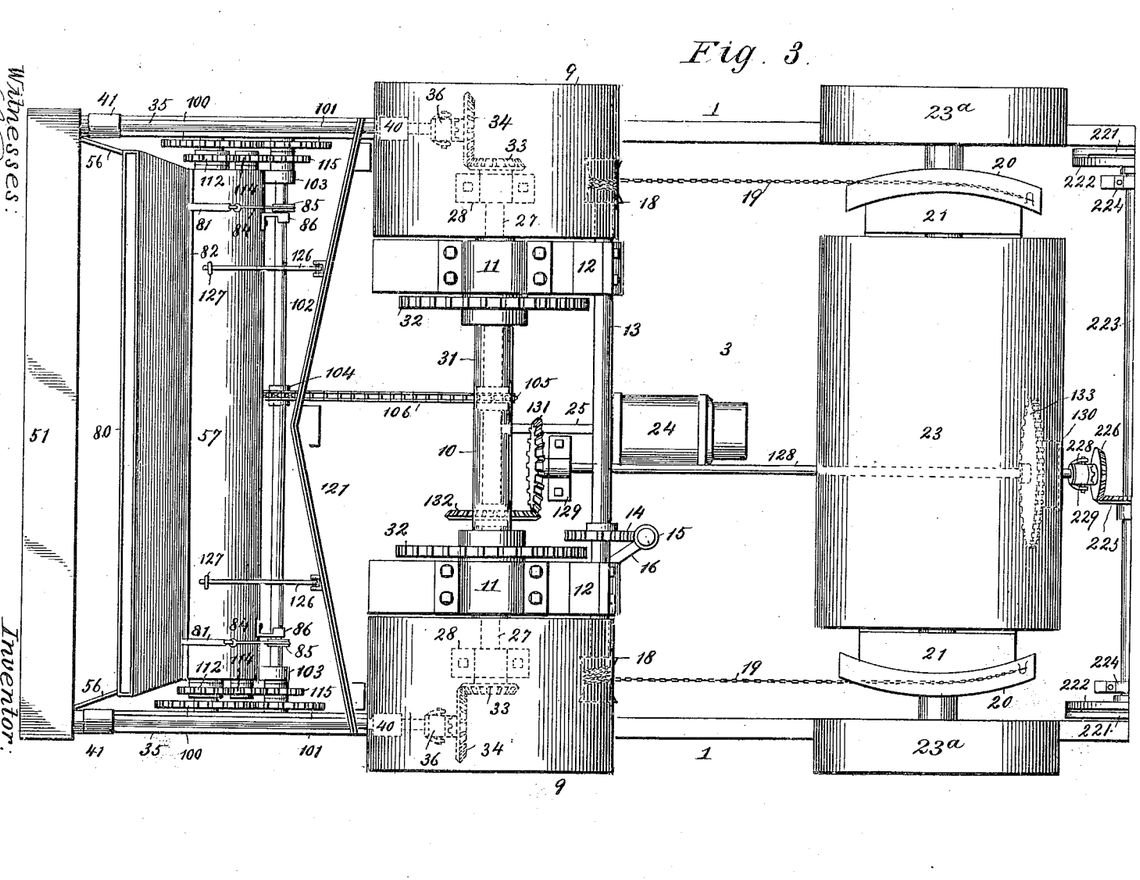
Fig. 3 is an inverted plan view of that part of the machine identified as Fig. 1.

9 9 designate the wide carrying wheels or rollers, the same being secured upon shaft 10, journaled in bearings 11, depending from the platform, and secured to the rear side of bearings 11 are bearings 12 for a shaft 13, the latter having a worm-wheel 14 meshing with the vertical worm 15, whose shaft is journaled in bearings 16, also secured to one of the bearings 11. Said worm-shaft extends up through the platform and is provided with a hand-wheel 17. Upon the opposite ends of shaft 13 are drums 18, from opposite sides of which rearwardly extend chains 19, secured to the flanged segments 20 of an arch 21, said arch being swiveled, as at 22, to and depending from the platform and carrying a roller 23, the latter being of sufficient length to overlap the inner edges of the paths of the carrying wheels or rollers 9, as shown clearly in Fig. 3, and mounted on the shaft of the roller are wheels 23$^a$, traveling in the same path as wheels 9. The operator upon the platform by manipulating hand-wheel 17 winds one chain and unwinds the other, thereby turning roller 23 for the purpose of guiding the machine to the right or left, the worm-gearing serving to hold the wheel at any angle desired, as well as giving the person in charge the great leverage necessary to turn said roller.

Figure 1:
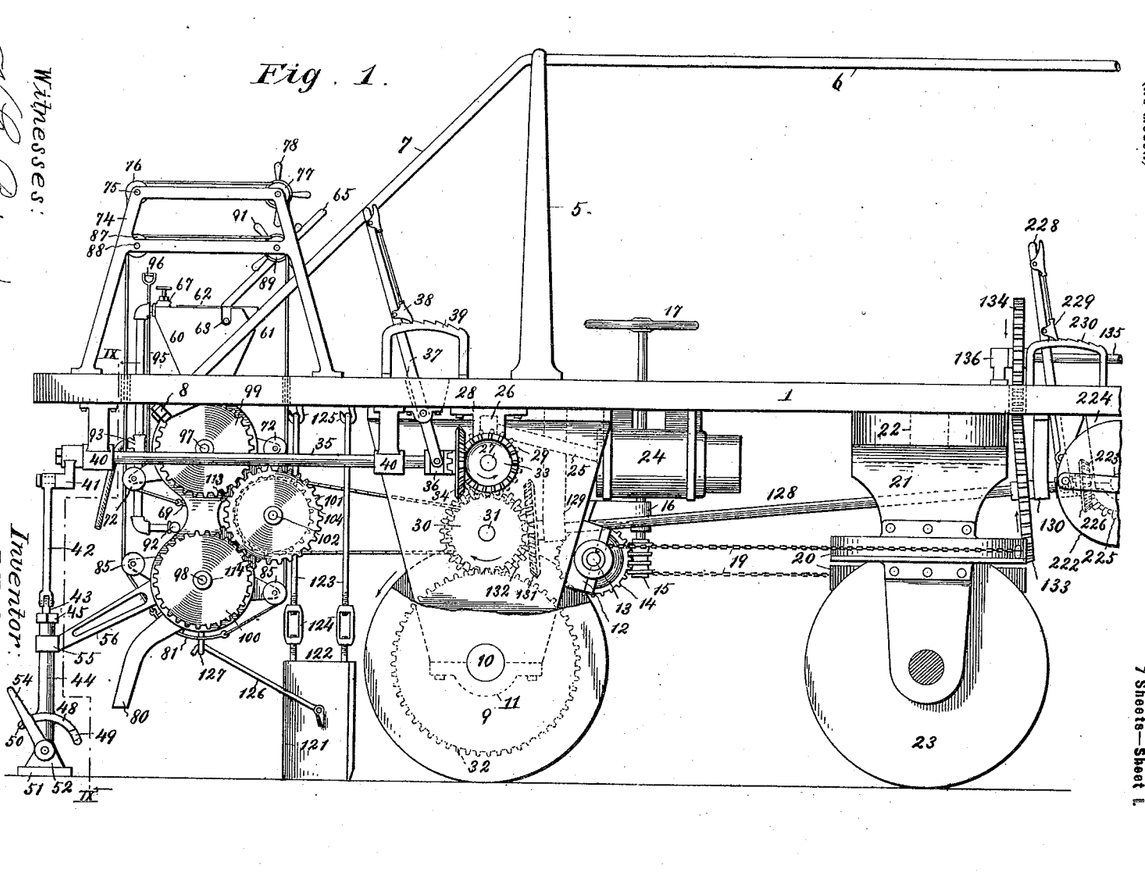
Figures 1 and 2 represent a side view of the machine, the scale to which said figure is drawn making the use of two sheets necessary.

24 designates an engine of any suitable type, secured to the under side of the platform adjacent to shaft 13 and having its piston-rod 25 connected to the crank 26 (see Fig. 1) of a transverse shaft 27, journaled in bearings 28, depending from the platform. Said shaft carries gear-wheels 29, meshing with gear-wheels 30 on a shaft 31, journaled in bearings 11, said wheels 30 constituting power-transmitting gears from the gear-wheels 29 to the large gear-wheels 32, secured upon shaft 10. Mounted also on shaft 27 are bevel-gears 33, meshing with similar gears 34, journaled upon longitudinal shafts 35. Gears 34 form a part of an ordinary clutch mechanism 36, the sliding element of which is operated by a lever 37, pivotally supported from and projecting up through the platform within convenient reach of the operator, a spring-actuated dog 38 on the lever and a toothed sector 39 on the platform being utilized to secure said clutch mechanism in or out of mesh with wheels 33. Shafts 35 are journaled in the depending standards 40 of the platform and have crank-arms 41 at their rear ends, the latter being pivotally connected by links 42 to reciprocatory pistons 43 for the purpose of operating certain mechanism as a tamper. This mechanism comprises a pair of vertical cylinders 44, into which said pistons 43 project, the ends of the cylinders being closed by screw-caps 45 in order to provide an abutment for the collars 46 upon the pistons, and thereby insure the elevation of the tamping mechanism as the pistons rise, and in order to permit of a full downstroke of the pistons in case the tamper fails to descend as far as usual from any cause—such, for instance, as an overabundance of material below it—springs 47 are fitted between the pistons and the bottoms of the cylinders, these springs being sufficiently stiff to avoid compression under the ordinary stroke of the tamper, but adapted to yield, of course, in case the tamper is prevented from making its full downstroke. 48 designates segmental arms formed with said cylinders and provided near their opposite ends with notches 49 50.

Figures 9, 10, 11, 12:
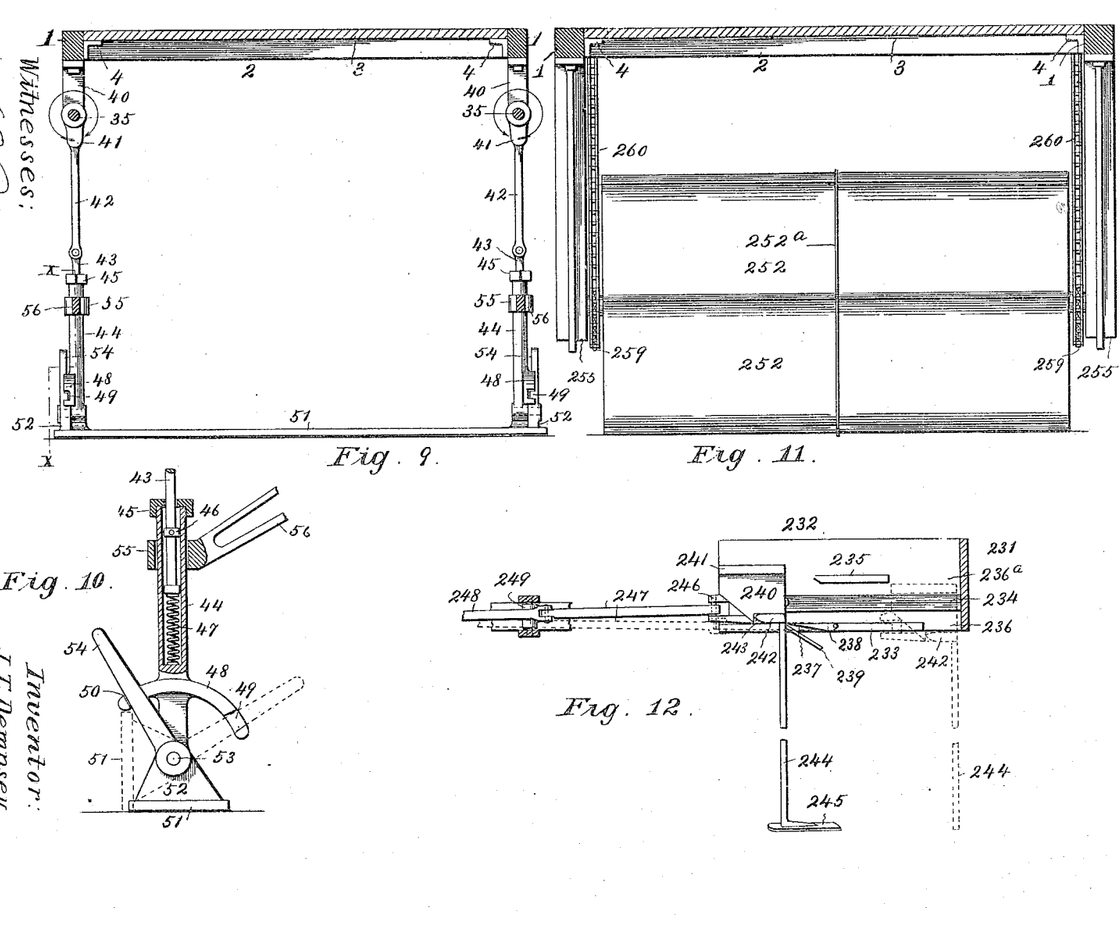
Fig. 9 is a section taken on the line IX IX of Fig. 1.
Fig. 10 is an enlarged section taken on the line X X of Fig. 9.
Fig. 11 is a section taken on the line XI XI of Fig. 2.
Fig. 12 is a vertical section taken on the line XII XII of Fig. 4.

51 designates the tamper or scraper accordingly as it occupies the position shown in full or dotted lines, Fig. 10. It extends the full width of the machine and is provided with arms 52 at its ends, pivoted, as at 53, to the cylinders and provided with arms or levers 54, adapted to engage notches 49 or 50, and thus hold the tamper or scraper in position to perform one function or the other, as will be readily understood by reference to Fig. 10.

The vertical reciprocation of cylinders 44 is insured by guides 55, formed at the lower ends of the braces 56, extending downwardly and forwardly from the granitoid-mixing part of the apparatus.

Figure 5:
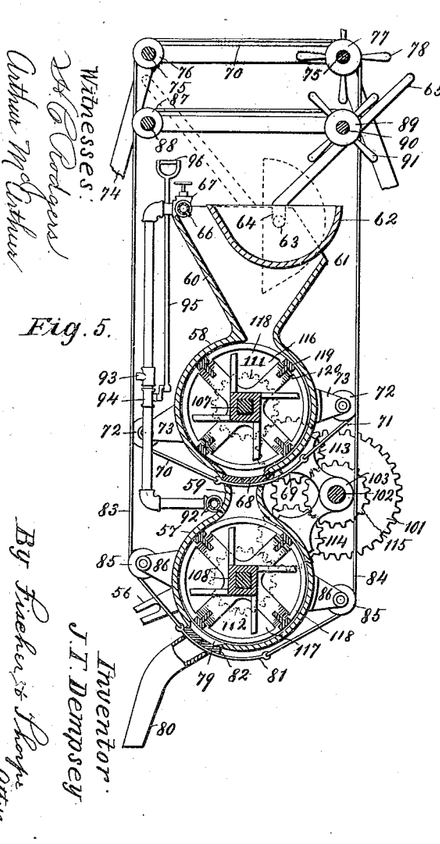
Fig. 5 is an enlarged vertical section of the granitoid-mixing apparatus.

The granitoid-mixing apparatus comprises the superposed cylinders 57 and 58, connected by a narrow neck or passage 59, cylinder 58 forming a hopper to charge cylinder 57 and provided with a superposed hopper 60. The upper rear corner of hopper 60 is cut away, as at 61, in order that it may conveniently receive the dumping-ladle 62, the latter having trunnions 63, journaled in notches 64 in the hopper, one of said trunnions being extended in the form of a lever 65, which when turned from the position shown in full to the position shown in dotted lines, Fig. 5, serves to dump the unmixed mass of granitoid chips, sand, and cement deposited therein in any suitable manner into the hopper 60, said mixture being at the same time saturated to the required extent by a charge of water from the jet-pipe 66, secured at the upper front corner of the hopper, the water-supply being controlled by a valve 67 within convenient reach of the operator. To retain the mixture of sand, granitoid, cement, and water in cylinder 58 the required length of time, said cylinder is provided with a movable bottom or cut-off 68, preferably flexible and carried by curved plates 69, fitting slidingly in the walls of the neck 59, the opposite ends of plates 69 being connected to cables 70 71, which extend forwardly and rearwardly of the cylinder and are guided vertically upward around guide-pulleys 72, carried by brackets 73, secured to the cylinder. A superstructure or skeleton framework 74 upon the platform embraces at its upper end cross-shafts 75, the foremost of which carries grooved guide-pulleys 76, while the other shaft carries winding-drums 77, and secured to said winding-drums are hand-wheels 78. Grooved pulleys 76 serve to guide cables 70 rearward to said drums, and said cables, as likewise cables 71, are secured to the drums in such a manner that when the hand-wheels are manipulated in one direction or the other the movable bottom opens or closes the passage through neck 59. Cylinder 57 is provided for its full width with a discharge-opening 79, communicating with a downwardly and forwardly depending spout 80, the latter, like neck 59, forming a support for curved plates 81, carrying a movable bottom or cut-off 82 for opening 79, the opposite ends of plates 81 being connected to the front cables 83 and the rear cables 84, guided around pulleys 85, journaled in brackets 86, secured to cylinder 57. Cables 83 are guided around pulleys 87 on a shaft 88, journaled below shaft 75 and above the cylinder, extending thence rearwardly, where they, like cables 84, are attached to winding-drums 89 upon a shaft 90, said shaft being adapted to be turned by hand-wheel 91 for the purpose of moving the bottom or cut-off 82 and permitting the granitoid to escape through the spout 80, which is arranged to discharge or distribute the granitoid in a stream of equal depth or thickness and for the full width of the machine, the discharge taking place just rearward of the tamper or scraper. The cylinder 57 is also provided with a spray or jet pipe 92 for discharging water therein, said spray or jet pipe, like spray-pipe 66, being connected by a branch pipe to the supply-pipe 93, leading to any suitable point. In practice it will probably be found desirable to have a wagon moving parallel and at equal speed with the machine and provided with a supply-tank, a pump, and a flexible connection to conduct water through pipe 93 and its branches thereof to the spray or jet pipes, and in order to control the passage of water through spray or jet pipe 92 the branch pipe leading thereto is provided with a valve 94, arranged to be operated by a reciprocatory rod 95, terminating in a handle 96, adjacent to valve 67. (See Fig. 5.)

Figure 6:
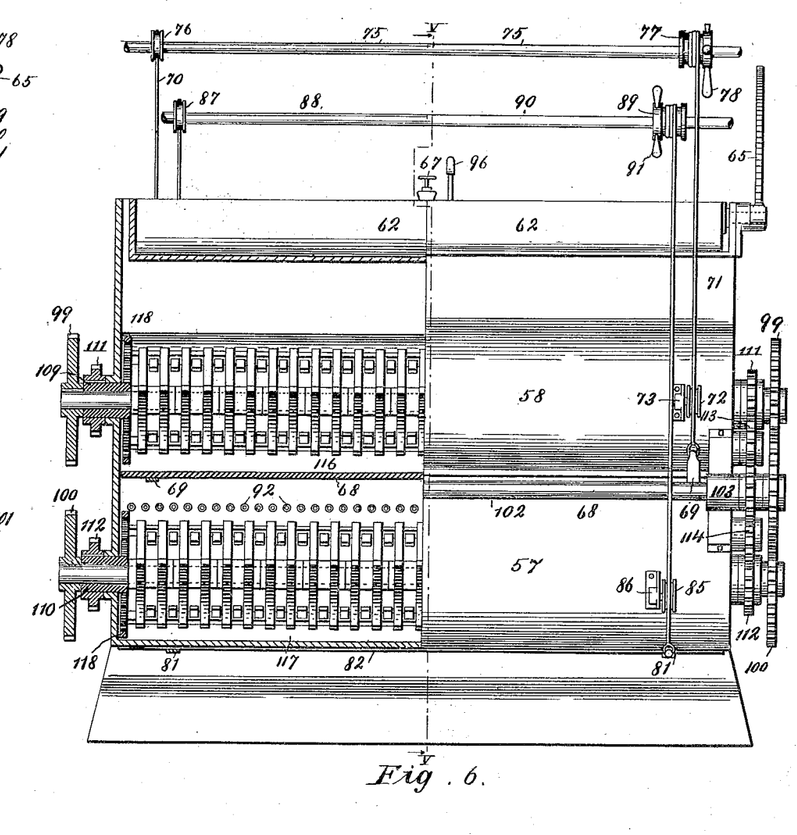
Fig. 6 is a rear view, partly in vertical section, of the same.

The mechanism for mixing the granitoid chips, sand, cement, and water thoroughly into a composite mass comprises shafts 97 and 98, journaled in cylinders 58 and 57, respectively, and provided externally thereof with gear-wheels 99 100, driven by gear-wheel 101, journaled on shaft 102, said shaft being mounted in bearings 103, secured on the cylinders, the shaft being driven through the medium of a sprocket-wheel 104 thereon, a sprocket-wheel 105 on shaft 31, and connecting-chain 106. Shafts 97 and 98 within the cylinders are rectangular in cross-section, and mounted non-rotatably thereon are skeleton agitators 107 108, respectively, said agitators consisting of square tubes with arms projecting outward therefrom. Journaled in the cylinders and forming a journal for said shafts are sleeves 109 110, said sleeves carrying gear-wheels 111 112, to which motion is imparted through the medium of power-transmitting gears 113 114 by gear-wheels 115 upon shaft 102. Within the cylinders and mounted upon said sleeves 109 110 are agitators 116 117, which surround and rotate through the medium of the gearing described in the opposite direction to agitators 107 108, said agitators 116 117 consisting of a pair of end wheels 118, connected by a number of longitudinal strips 119, provided with inwardly-projecting arms 120, said arms breaking joint with the arms of the first-named agitators 107 108, as shown clearly in Fig. 6, so as to more reliably effect an intimate mixture or commingling of the granitoid chips, sand, cement, and water discharged into the cylinders, it being understood, of course, that a pair of these cylinders are shown primarily because, while the lower one is discharging the prepared granitoid the upper one may be engaged in the act of mixing a second charge. The continuation of the discharge of the granitoid mixture therefrom is therefore assured as long as the machine is in operation, if desired, it being understood, of course, that when the cut-off 68 is slid open to permit the material in cylinder 58 to pass into cylinder 57 and is then reclosed a new charge of granitoid chips, sand, cement, and water must be supplied to cylinder 58, and for convenience it will be found desirable to supply the machine with sacked material, as thereby the work will be materially facilitated.

In order to distribute the granitoid evenly as it is discharged from cylinder 57, I provide an approximately V-shaped leveler 121, with its apex advanced and disposed centrally of the machine, so as to tend to deflect the material forwardly and laterally and avoid any possibility of the material piling up in front of any particular part of the leveler, and thereby offering undue resistance to the progress of the machine. This leveler is adjustably suspended from the platform of the machine just in advance of wheels 9 by means of oppositely-threaded rods 122 123, connected by turnbuckles 124, rods 123 being preferably detachably engaged with hooks 125 at their upper ends, and in order to stay or brace the leveler against backward movement when pressing forward against the granitoid it is provided with a plurality of pivoted tie-rods 126, hooked at their front ends to sleeves 127, depending from cylinder 57.

In the practical operation of laying a granitoid sidewalk this machine is brought into service as soon as the cinders (the usual bed for granitoid walks) have been placed in the excavation, it being understood, of course, that the boards, tracks, or ways at opposite sides of the excavation shall first have been secured in position, said boards or ways presenting a wide or extended bearing for wheels 9 and 23ª, which cannot sink under the weight of the machine, and therefore insures that the granitoid shall be laid with its surface perfectly level. Assuming now that the lower cylinder is charged with granitoid properly mixed and that the upper cylinder is engaged in mixing a second charge, the engine 24 is started to propel the machine forward through the instrumentality of the gearing already described, wheels 9 and 23ª traveling on the boards, tracks, or ways at opposite sides of the excavation. Levers 54 are set to cause the tamper or scraper 51 to tamp the cinders under the rotary action of crank-shafts 35, said shafts being thrown in gear with shaft 27 by a clutch mechanism already described. The granitoid is discharged in a continuous stream from spout 80 upon the tamped cinders immediately rearward of the tamper and is immediately thereafter leveled by the leveler 121, the same being adjusted by the turnbuckles 124 in order that the granitoid may be laid to the depth required, this being determined, of course, by the specifications of the city engineer or other authority. Following the action of the leveler on the granitoid comes that of the roller 23, which is of sufficient weight to pack the granitoid solidly down upon the cinders and leave its upper surface leveled and ready to receive the usual facing of cement. Where the walk is curved, the engineer or person in charge manipulates hand-wheel 17 to cause the machine to follow such curvature. When approaching the end of the excavation or any other point where it is impossible to discharge the granitoid directly, the engineer reverses the direction of travel of the machine, at the same time permitting the requisite quantity of granitoid to escape from spout 80. Levers 54 are then grasped by attendants, if desired, and thrown to the position shown in dotted lines, in order that the tamper may be utilized as a scraper. As such the machine is again propelled forward, so that the scraper shall force the surplus quantity of granitoid forward to the end of the excavation. The travel of the machine is again reversed and the levers 54 thrown back to their original position in order that as the machine again advances the material may be tamped clear up to the end of the excavation.

Referring now to the mechanism for mixing and laying cement upon the granitoid after the latter has become "set," 128 designates a longitudinally-extending shaft journaled in bearings 129 130, depending from the platform and receiving motion through the medium of bevel gear-wheel 131 on one end, meshing with a bevel-gear 132 on shaft 31. Near its front end it is provided with a large bevel-gear 133, meshing with and imparting motion to gear-wheel 134, secured upon longitudinal shaft 135, journaled in bearings 136 upon the platform. Journaled on said shaft and forming one element of a clutch mechanism of the usual construction is a bevel-gear 137, the other or sliding member 138 being movable by lever 139, pivoted on a sector 140, and provided with a dog 141 to engage the teeth of the sector and hold said clutch members in or out of engagement to insure the rotation or non-rotation of bevel-gear 137, and consequently of a bevel-gear 142, having its shaft journaled in a frame 143, the upper end of said shaft carrying a gear-wheel 144 to transmit motion through a pair of idle gears 145, journaled on said frame, to the gears 146, said gears being journaled on the upper ends of a pair of vertical shafts 147, journaled in frame 144, and in a pair of similar cement-mixing casings 148, arranged side by side and supported in position in any suitable or preferred manner. The major portions of these casings are below the platform, so that the openings 149 in their front sides shall be in the most convenient position to receive the sand and cement. The segmental bottom of each casing is provided rearward of its center by preference with a semicircular opening 150, registering with the upper end of a segmental discharge-spout 151, the said discharge-spouts merging together at their contiguous ends, so that cement from one casing or the other may also fill the section of the spout below the companion casing in order that cement may be discharged in a stream of uniform thickness from one side of the granitoid to the other. A segmental or semicircular cut-off 152 for opening 150 is mounted in the upper portion of each spout and is carried by plates 153, connected at their front ends by a pair of cables 154, guided around suitable pulleys 155 to winding-drums 156, secured to the shaft 157, journaled in and forming a part of a superstructure or skeleton framework 158, erected on the platform, said winding-drums having a hand-wheel 159 by which the shaft may be operated. The rear ends of plate 153 are connected by a pair of cables 160, guided around pulleys 161, suitably supported, and 162, mounted in the superstructure, extending thence forwardly where they are attached to winding-drums 156, to the end that the manipulation of said drums shall cause one set of said cables to be wound up as the others are unwound in the operation of the cut-off.

163 designates a cut-off at the lower end of each spout and mounted upon plates 164, connected at their front ends by cables 165, guided around pulleys 166, carried by arms 167, projecting forward from the spout and from said pulleys extending upwardly and attached to drums 168 upon shaft 169 of the superstructure 158, said drums being provided with hand-wheels 170 for convenience of operation. The rear ends of said plates are connected to cables 171, guided around suitably-supported pulleys 172 and pulleys 173 of the superstructure, thence extending forwardly to drums 168, to which they are attached.

The casings 148 are each provided with a pair of annular water-passages 174 175 to discharge water downwardly and inwardly upon the mixture of cement and sand, so as to thoroughly saturate the latter before it reaches the bottom of the casing, the water being supplied to said passages through branch pipes 176 177, respectively, of a supply-pipe 178, controlled by a valve 179, said supply-pipe being adapted to receive its charge of water in the manner already described with reference to the granitoid-mixing apparatus or in any other suitable or preferred manner. Between the opening 149 and the water-passage 174 a horizontal paddle-wheel 180 is secured upon each shaft 147, and just above each water-passage 175 is a similar wheel 181, these wheels being for the purpose of effectually breaking up any clods or lumps which may exist in the cement or sand and cause a thorough commingling or intermixture thereof with the water.

Figure 2:
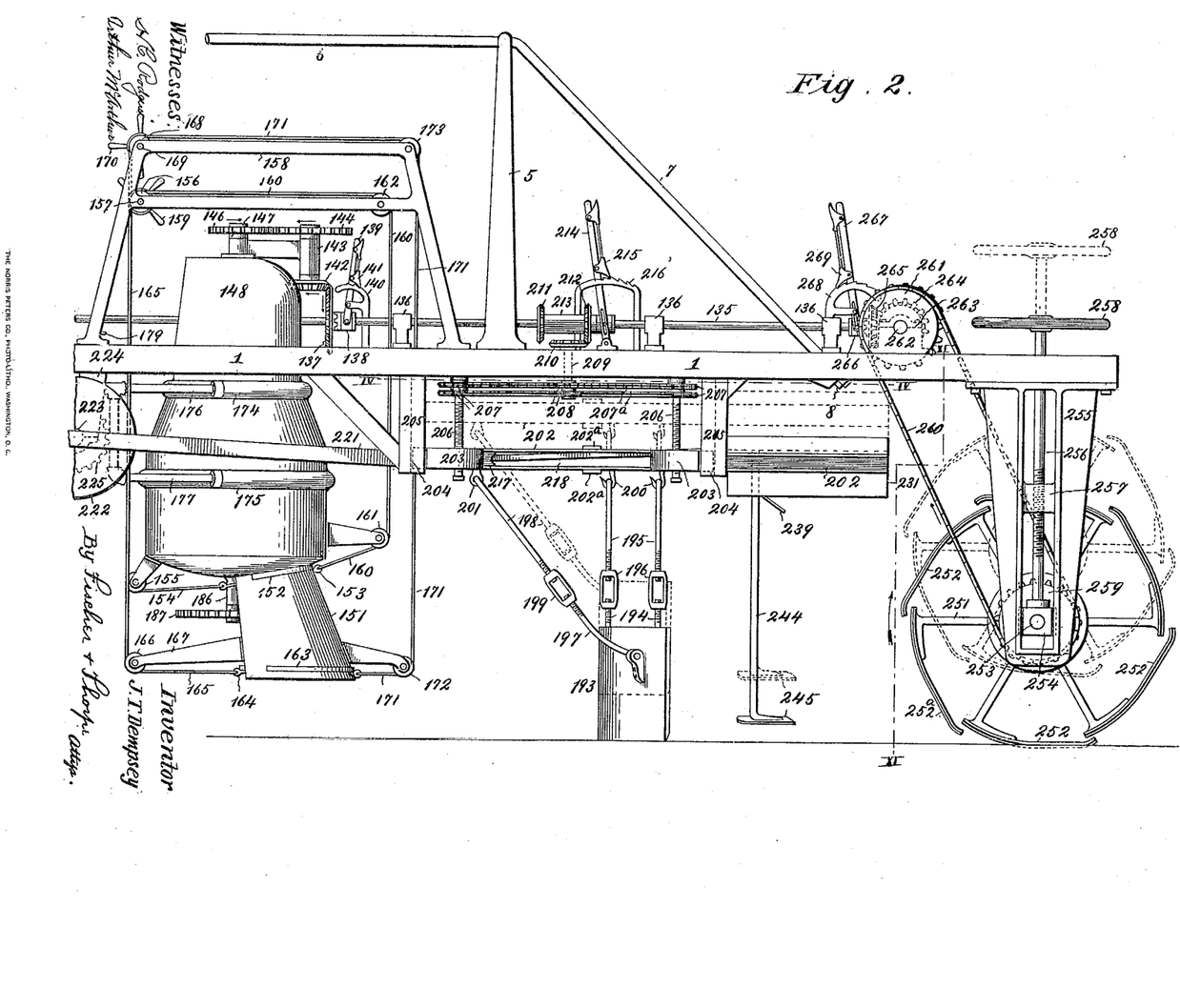
Figure 7:
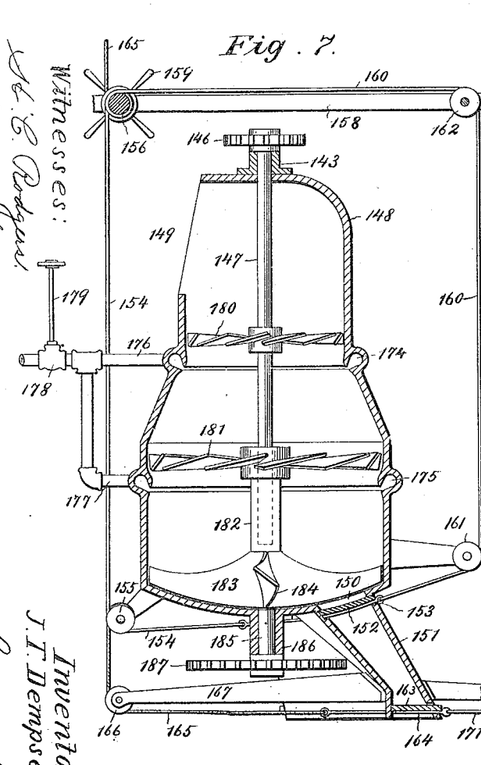
Fig. 7 is an enlarged vertical section of the cement-mixing apparatus.
Figure 8:
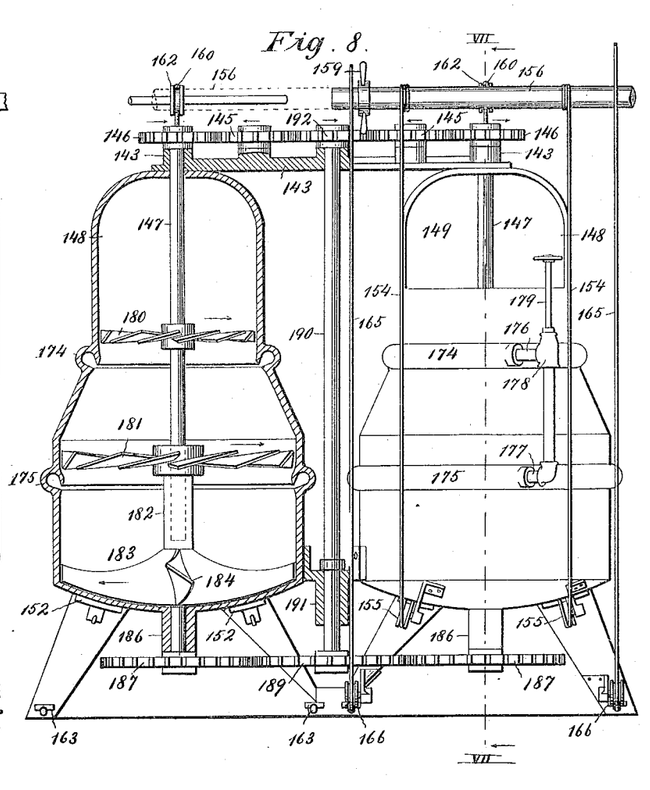
Fig. 8 is a front view, partly in vertical section, of the same.

The lower ends of shafts 147 are journaled in and form a journal for the upwardly-projecting sleeves 182 of mixing-wheels 183, conforming to the curved bottoms of the casings, said wheels having their outer corners bent, as at 184, for the purpose of facilitating the passage of the same through openings 150 and into the discharge-spout registering therewith. Said wheels are also provided with depending stub-shafts or trunnions 185, journaled in bearings 186, formed at the lower end of the casing, and carrying large gear-wheels 187, driven by a similar gear-wheel 189 on the lower end of a vertical shaft 190, arranged between the casings and journaled at its lower end in a bearing 191, secured to the casing, and at its upper end in the frame 143, hereinbefore referred to, and upon the upper end of said shaft is a gear-wheel 192, meshing with and driven by the gear-wheel 144, (see Fig. 2,) the arrangement being such that said gear-wheel, through the medium of the interposed chains of gearing described, rotates the paddle-wheels 180 181 and the mixing-wheels 183 in opposite directions, the former preferably in the direction indicated by the arrows, Figs. 7 and 8.

Assuming that both casings have received the ingredients and evolved therefrom the cement and it is desired to "lay" said cement upon granitoid in condition to receive a cement facing, the attendant first operates cut-off 150 of one of the casings and starts the engine to force the charge of cement out of said casing and into the spout, said charge being preferably adapted to fill both sides. He then closes said cut-off, opens the cut-off of the companion casing, and as he starts the machine opens one or both cut-offs 163, accordingly as a narrow or wide walk is being constructed. He then recharges the empty casing in order that the latter may have a new charge of cement prepared by the time the other casing is empty, when he again opens the valve of the first-named casing and closes that of the companion one for the purpose of preparing a new charge. This alternate charge and discharge of said casings takes place as long as the machine is in operation in order that the cement may be laid in the most economical manner and shortest possible time.

Referring now to the mechanism for evenly distributing and leveling the cement upon the granitoid, 193 designates a leveler of about the same construction as leveler 121, and like the latter it is adjustably supported by means of threaded rods 194 195 and turnbuckles 196 and is also adjustably braced by tie-bolts 197 198 and turnbuckles 199. The upper ends of rods 195 and of tie-rod 198 are pivotally hooked, as at 200 and 201, respectively, to a pair of longitudinal channel-bars 202, forming in conjunction with connecting brace-bars 202ª a horizontal frame. Said channel-bars carry nuts 203, formed with vertical T-shaped portions 204, mounted in vertical guide-posts 205, depending from the platform and braced in any suitable manner, and in order that the leveler may be raised to inoperative position when desired the nuts 203 engage vertically-depending screws 206, journaled in the platform in any suitable manner and having sprocket-wheels 207, connected by chains 207ª to sprocket-wheels 208 on a vertical shaft 209, journaled in the platform and carrying a bevel-gear 210 on its upper end, this bevel-gear receiving motion in one direction or the other from one or the other of the bevel-gears 211 212, secured to opposite ends of the sleeve 213, mounted to rotate with but slide upon shaft 135, said gear-carrying sleeve being adjusted through the medium of the lever 214, fulcrumed on the platform and provided with a dog 215, to engage a sector 216, to lock the sleeve with one or the other of said gear-wheels engaging gear-wheel 210, or with neither engaging the same, the latter condition being that which it assumes while the machine is in actual operation in order to insure the even distribution of the cement upon the granitoid. When the machine is to travel inoperatively from one point to another, lever 214 is manipulated to effect the rotation of the screws 206 in the direction necessary to raise the leveler to the position described. The reverse operation of the lever of course effects the descent of the leveler.

Figure 4:
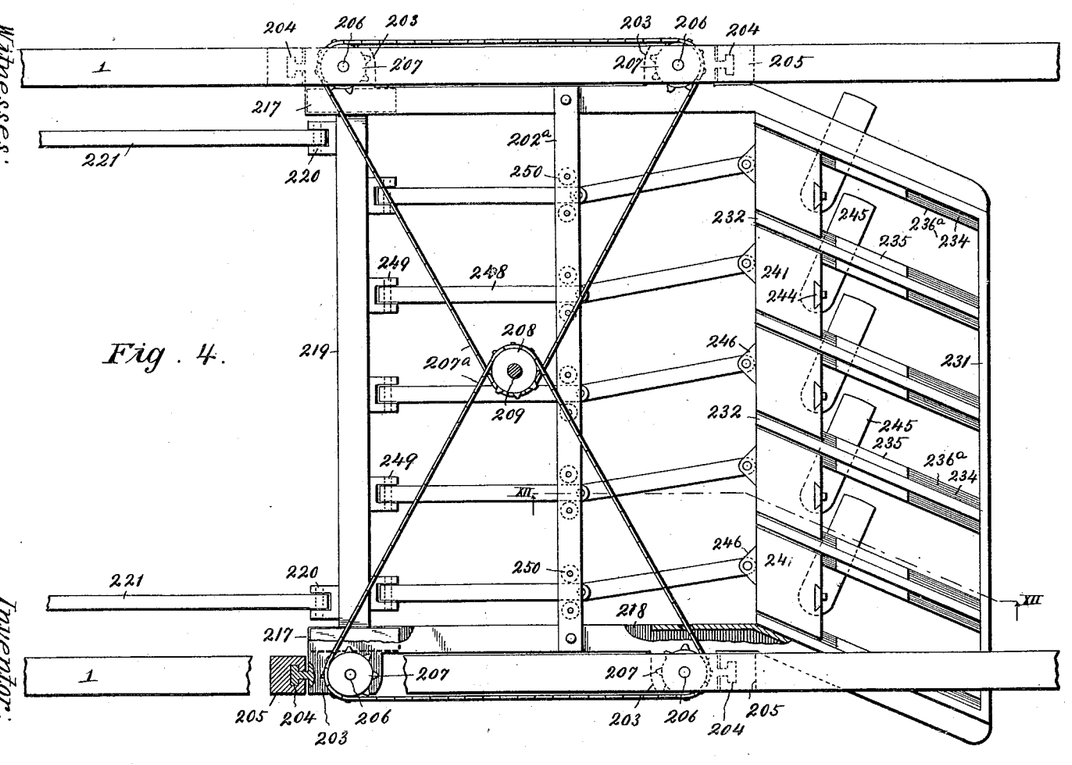
Fig. 4 is an enlarged horizontal section taken on the line IV IV of Fig. 2.

The vertically-adjustable channel-bars 202 are preferably of channel-iron construction, with their channels presented outwardly to provide ways for the support and guidance of end blocks 217, the inner wall of said channel-irons being cut away or slotted, as at 218, to receive said blocks and the cross-bar 219, connecting and constituting in conjunction with them a reciprocatory cross-head. This cross-head is pivotally connected at 220 to a pair of pitmen 221, wristed at their front ends on disks 222 of a transverse shaft 223, journaled in bearings 224, depending from the platform, said shaft deriving its motion through the medium of a bevel-gear 225 thereon, meshing with a similar gear 226, journaled on the front end of shaft 128, said gear 226 forming one member of a clutch mechanism, while the other or sliding member 227 is adapted to be operated by a lever 228, suitably fulcrumed on and projecting up through the platform and provided with a dog 229 for engagement with a sector 230 to lock said gear 226 in or out of engagement with shaft 128. From a point contiguous to the rearmost screws 206 (see Figs. 2, 4, and 12) the channel-bars extend obliquely to one side and carry a parallelogram-shaped frame 231, having its front side open and its ends parallel with and secured to said bars, and said frame is provided with a series of vertical partitions 232, parallel with its ends and provided on their opposing faces with the horizontal superposed tracks 233, 234, and 235, the first and last named tracks terminating short of the rear side of frame 231 to provide openings 236 236ª for a purpose which presently appears, and about midway its length track 233 is provided with an opening 237, the latter being normally closed by a gravity-switch 238 and having an underlying deflecting-track 239. A series of sliding frames each consist of a vertical block 240, a top block 241, projecting laterally beyond the first-named block, and the bottom block 242, the latter also projecting beyond the sides of block 240 and having the front edges of said projecting portions pointed, as at 243. These frames fit between said partitions, with the top block arranged to reciprocate forwardly between tracks 234 and 235 and rearwardly above the latter and the bottom block to reciprocate between tracks 233 and 234 and below the former. Each frame has a vertically-depending rod 244, carrying a trowel 245 at its lower end, and has forwardly-projecting lugs 246, pivotally connected by links 247, adapted to operate laterally, to links 248, having vertically-pivoted connections, as at 249, with the cross-head, said links being guided to reciprocate in a direct back-and-forth movement by guide-rollers 250, journaled between cross-bars 202ª. In practice as the cross-head reciprocates rearwardly under the action of pitmen 221 the sliding frames move in the same direction, with the bottom blocks upon track 233 and the top blocks preventing the frames tilting by fitting squarely upon tracks 235 until as the bottom blocks 242 clear the rear ends of tracks 233 and the top blocks clear the rear ends of tracks 235 they drop vertically unti said top blocks rest upon the intermediate tracks 234, with the trowels 245 upon or in position to engage and trowel the cement. As the pitmen make their forward strokes they are accompanied by the trowel-carrying frames, the trowels being held down upon the cement, so as to level the same properly by the engagement of the bottom blocks 242 against the under side of tracks 233, and it will be noted in this connection that the upper bevel of the pointed edges of said blocks will tend to deflect them downward to the proper plane by contact with the rear ends of tracks 233 at the initial part of the forward stroke. As the lower bevel of the pointed ends strikes the deflecting-tracks 239, the frames are deflected upwardly, the upper blocks clearing the front ends of tracks 235 as the lower blocks force the gravity-switch 238 upward and pass forwardly thereof upon tracks 233. The forward stroke terminates as this position is fully attained, and the switches drop back to their original positions to clear the way for the immediately-following rearward movement. It will thus be seen as the forward or operative stroke of the trowels is completed, this stroke by reason of the oblique travel of the frames and trowels closely imitating the movement of the skilled workman's hand, that the trowels are lifted clear of the cement and are held out of contact therewith until they begin the next forward stroke, and in this connection it is to be understood that while I have illustrated only a single set of what I term "floating trowels" I may employ two or more sets adapted to work alternately in order that no part of the cement shall remain untroweled, it being obvious by reference to Fig. 4 that the trowels overlap, and therefore insure that practically the entire width of the cement shall be acted upon.

In order to give the cement surface the required "finish," and incidentally provide it with the usual longitudinal groove or crack, I provide a trowel-roller, the same comprising a plurality of spokes 251 with a sectional rim, a resilient rim-section 252 being carried by each spoke and projecting rearward thereof and overlapping the front end of its neighbor in order that no portion of the cement shall be skipped, each resilient rim-section or trowel being provided with a central rib 252$^a$ in order that the continuous groove or crack usually found in granitoid walks may be made. This trowel-roller is mounted upon a shaft 253, journaled in boxes 254, mounted in depending guide-frames 255, being raised or lowered through the medium of screws 256, swiveled at their lower ends to the boxes and passing through threaded passages 257 of said frames, said screws being provided with hand-wheels 258 upon their upper ends, whereby the screws are manipulated to raise the trowel-roller to the inoperative position, (shown by dotted lines, Fig. 2,) when the machine is traveling inoperatively from one point to another, and in order to impart the desired rotary motion to said roller sprocket-wheels 259 are mounted on shaft 253 and are connected by sprocket-chains 260 to sprocket-wheels 261 upon a transverse shaft 262 in bearings 263 upon the platform, said shaft also carrying a bevel-gear 264, meshing with and receiving motion from a bevel-gear 265, journaled on shaft 135 and forming one member of a clutch mechanism, the other member 266 being adapted to slide under the action of the lever 267, journaled upon a toothed sector 268, erected upon the platform and provided with a dog 269 for engagement with said toothed sector for the purpose of throwing said trowel-roller in or out of gear.

As the various functions of the cement portion of the machine have been described in detail, it is believed unnecessary to recapitulate the same, it being desirable to state, however, that as the cement is discharged upon the granitoid it is first leveled by the leveler, then immediately smoothed over by the floating trowels, and finished by the trowel-roller, the latter making its surface smooth and even, it being understood, of course, that such points as cannot be conveniently acted upon by the floating trowels and trowel-roller are adapted to be finished by hand in the usual manner.

From the above description it will be apparent that I have produced a machine for mixing and laying granitoid walks which embodies the features of advantage enumerated as desirable in the statement of invention, and which, while embracing the preferred form of construction, is susceptible of various modifications as regards its form, proportion, and detail construction or arrangement of the parts without departing from the principle and scope or sacrificing any of its advantages.

Having thus described the invention, what I claim as new, and desire to secure by Letters Patent, is—

1. In a machine of the character described, a wheeled frame, crank-shafts journaled therein, links depending pivotally from the cranks thereof, vertically-reciprocatory cylinders suitably guided, containing expansive springs, screw-caps for said cylinders, plungers extending through said caps into the cylinders and pivoted at their upper ends to said links, collars on the plungers within the cylinders, tamping-plates pivotally carried by said cylinders, and means for securing said tamping-plates horizontal or on edge, substantially as described.

2. In a machine of the character described, a pair of cylinders, each provided with a notched arm, a bar connecting and pivotally suspended from the cylinders and provided with an arm to engage one of said notches and hold the tamper or scraper in position for tamping or to engage the other notch and hold it in position to act as a scraper, substantially as described.

3. In a machine of the character described, a wheeled framework, means for mixing and discharging a granitoid mixture, mounted in said framework, a leveler suspended from the framework and adapted to level the granitoid mixture as the machine moves forward, an adjustable connection hooked to the framework and carrying said leveler, and braces pivoted at their rear ends to said leveler and hooked at their front ends to fixed parts of the machine, substantially as described.

4. In a machine of the character described, a wheeled framework, a vertically-adjustable leveler-carrying frame, a cross-head reciprocating longitudinally therein, a guide-frame carried at the rear end of the first-named frame, and a series of trowel-carrying frames slidably mounted in the guide-frame and connected to said cross-head, substantially as described.

5. In a machine of the character described, a guide-frame, sliding frames mounted therein, and adapted when moved forward to occupy a lower plane than when moved rearward, and trowels carried by said frames and adapted to act upon the cement when moving forward, substantially as described.

6. In a machine of the character described, a wheeled framework, a vertically-adjustable leveler-carrying frame, a cross-head reciprocating longitudinally therein, a guide-frame carried at the rear end of the first-named frame and extending at an angle thereto, parallel partitions mounted in said frame and also extending at the same angle as the last-named frame, and a series of trowel-carrying frames slidably mounted in said guide-frame; the end of one trowel projecting beyond the contiguous end of the adjacent trowel so that by breaking joint with the latter the surface operated upon shall be brought to a uniform plane, substantially as described.

7. In a machine of the character described, a wheeled framework, a vertically-adjustable leveler-carrying frame, a cross-head reciprocating longitudinally therein, a guide-frame carried at the rear end of the first-named frame and extending at an angle thereto, parallel partitions mounted in said frame and also extending at the same angle as the last-named frame, a series of trowel-carrying frames slidably mounted in said guide-frame; the end of one trowel projecting beyond the contiguous end of the adjacent trowel so that by breaking joint with the latter the surface operated upon shall be brought to a uniform plane, and means whereby the sliding frames shall, when moving forward, occupy a lower plane than when moving rearward, and thereby cause the trowels to act upon the cement only when moving forward, substantially as described.

8. In a machine of the character described, a guide-frame, provided with three sets of tracks the undermost and topmost sets terminating short of the rear end of the frame so as to provide openings, the former having a second opening and a gravity-switch closing the same, trowel-carrying sliding frames, embracing top and bottom blocks, means to force the frames rearwardly with their bottom blocks resting on the undermost tracks until said first-named openings are reached to permit the frames to drop until the topmost blocks rest upon the undermost tracks, and the trowels upon the cement, means to force the frames forwardly with the bottom blocks underlying the undermost tracks, deflecting-tracks to deflect said bottom blocks and consequently the frames upwardly past the switches of the undermost tracks until they again rest upon the undermost tracks, substantially as described.

9. In a machine of the character described, a wheeled framework, slotted brackets depending therefrom, adjustable journal-boxes mounted in said brackets, a shaft journaled in the boxes, and a trowel-roller journaled therein and rotating in the opposite direction to the carrying-wheels, said trowel-roller comprising spokes carrying a sectional resilient rim, each rim-section projecting from one spoke to and slightly overlapping that of the next succeeding spoke, substantially as described.

10. In a machine of the character described, a wheeled framework, and a trowel-roller journaled therein and comprising spokes carrying a sectional resilient rim, the rim-sections projecting from one spoke to and slightly overlapping the next succeeding spoke, and provided with central ribs, adapted to form a longitudinal groove in the cement, and means for rotating said roller, substantially as described.

11. In a machine of the character described, a wheeled framework, a trowel-roller journaled therein, and comprising spokes carrying a sectional resilient rim, the rim-sections projecting from one spoke to and slightly overlapping the succeeding spoke, and provided with central ribs, adapted to form a longitudinal groove in the cement, means for rotating said roller, and means for vertically adjusting the roller, substantially as described.

12. In a machine of the character described, a wheeled framework, means for mixing and discharging cement mounted in said framework, a leveler below the framework and adapted to level the cement mixture as the machine moves forward, a vertically-adjustable frame carried below the framework, adjustable rods hooked to said frame at their upper ends and attached to the leveler at their lower ends, and an adjustable brace attached at its front or upper end to said frame and at its lower or rear end to the leveler, substantially as described.

In testimony whereof I affix my signature in the presence of two witnesses.

JAMES T. DEMPSEY.

Witnesses:
H. C. RODGERS,
G. Y. THORPE.